United States Patent
Recknagel et al.

(10) Patent No.: US 7,353,671 B2
(45) Date of Patent: Apr. 8, 2008

(54) ADJUSTABLE WIDTH COUPLER LATCH LOCK

(75) Inventors: Jim Recknagel, Delafield, WI (US); Ken Burmesch, Port Washington, WI (US); Victor Yip, Hong Kong (HK); John Zapushek, Racine, WI (US)

(73) Assignee: Master Lock Company, LLC, Oak Creek, WI (US)

( * ) Notice: Subject to any disclaimer, the term of this patent is extended or adjusted under 35 U.S.C. 154(b) by 0 days.

(21) Appl. No.: 10/707,528

(22) Filed: Dec. 19, 2003

(65) Prior Publication Data

US 2004/0211230 A1 Oct. 28, 2004

Related U.S. Application Data

(60) Provisional application No. 60/434,920, filed on Dec. 19, 2002, provisional application No. 60/481,330, filed on Sep. 4, 2003.

(51) Int. Cl.
*B60R 25/00* (2006.01)
*E05B 67/36* (2006.01)

(52) U.S. Cl. .............................. 70/34; 70/258; 70/462; 280/507

(58) Field of Classification Search .................... 70/34, 70/461, 462, 124, 129, 258, 14, 23, 26, 32, 70/33, 38 R, DIG. 66, 38 C, 39, 38 A, 53, 70/DIG. 9; 280/507, 511–513
See application file for complete search history.

(56) References Cited

U.S. PATENT DOCUMENTS

| | | | | |
|---|---|---|---|---|
| 233,255 A * | 10/1880 | Kimble | .......................... | 24/658 |
| 1,368,711 A * | 2/1921 | Foley | .......................... | 292/148 |
| 1,445,719 A * | 2/1923 | Rozycki | .......................... | 70/26 |
| 1,453,139 A * | 4/1923 | Huston | .......................... | 70/260 |
| 1,495,115 A * | 5/1924 | Setterberg | .......................... | 70/34 |
| 1,592,696 A * | 7/1926 | Heyer | .......................... | 70/34 |
| 1,638,264 A * | 8/1927 | Junkunc | .......................... | 70/39 |
| 1,660,903 A * | 2/1928 | Adamson | .......................... | 70/38 A |
| 1,690,938 A * | 11/1928 | Maxwell | .......................... | 70/53 |
| 1,695,696 A * | 12/1928 | Page | .......................... | 70/260 |

(Continued)

FOREIGN PATENT DOCUMENTS

DE 20016283 U1 6/2001

(Continued)

*Primary Examiner*—Lloyd A. Gall
(74) *Attorney, Agent, or Firm*—Calfee, Halter & Griswold LLP

(57) ABSTRACT

An adjustable coupler lock for locking a trailer hitch such that a trailer cannot be removed from a vehicle. The coupler lock comprises a lock body with a locking mechanism and a locking plate, and also comprises a shaft having a narrow and a flange end, and also having multiple recesses along the length of the shaft for engagement with the locking plate of the lock body. The recesses along the length of the shaft have a vertical edge which engages the locking plate such that the lock body cannot be removed from the shaft without unlocking the locking mechanism. The recesses also have a tapered edge that allows for slidable movement of the lock body along the shaft, without unlocking the locking mechanism, for the purpose of adjusting the lock to the size of the latch. The components of the coupler lock are made of stainless steel.

16 Claims, 6 Drawing Sheets

U.S. PATENT DOCUMENTS

| | | | | |
|---|---|---|---|---|
| 1,744,984 | A * | 1/1930 | Page | 70/34 |
| 2,508,302 | A * | 5/1950 | Stue | 70/19 |
| 3,423,968 | A * | 1/1969 | Foote | 70/14 |
| 3,429,151 | A * | 2/1969 | Weingart | 70/14 |
| 3,695,657 | A * | 10/1972 | Rosen | 292/57 |
| 4,003,227 | A * | 1/1977 | Casey | 70/14 |
| 4,008,590 | A * | 2/1977 | Berkowitz et al. | 70/424 |
| 4,098,100 | A * | 7/1978 | Wah | 70/38 A |
| 4,226,100 | A * | 10/1980 | Hampton et al. | 70/51 |
| 4,290,280 | A * | 9/1981 | Yun | 70/38 A |
| 4,317,344 | A * | 3/1982 | Barnard | 70/55 |
| 4,322,102 | A * | 3/1982 | Lindblom | 292/281 |
| 4,576,021 | A | 3/1986 | Holden | 70/34 |
| 4,756,172 | A | 7/1988 | Weaver | 70/58 |
| 4,760,719 | A * | 8/1988 | Evans et al. | 70/18 |
| 4,792,151 | A | 12/1988 | Feld | 280/406 A |
| 5,222,755 | A | 6/1993 | O'Neal | 280/507 |
| 5,404,734 | A * | 4/1995 | Martinez | 70/34 |
| 5,417,092 | A * | 5/1995 | Iu | 70/38 A |
| 5,467,620 | A * | 11/1995 | Byrd, Jr. | 70/38 A |
| 5,515,947 | A | 5/1996 | Shieh | 188/69 |
| 5,638,710 | A * | 6/1997 | Howard et al. | 70/259 |
| 5,676,258 | A * | 10/1997 | Leyden et al. | 211/7 |
| 5,682,775 | A * | 11/1997 | Baber | 70/34 |
| 5,727,805 | A | 3/1998 | La Roque | 280/478.1 |
| 5,819,561 | A * | 10/1998 | Blehi, III | 70/14 |
| 5,921,115 | A * | 7/1999 | Winner | 70/18 |
| 6,393,883 | B1 * | 5/2002 | Freck | 70/491 |
| 6,523,849 | B1 * | 2/2003 | Brown et al. | 280/512 |
| 6,682,089 | B2 | 1/2004 | McCoy et al. | 280/438.1 |
| 6,685,210 | B2 | 2/2004 | Lindenman et al. | 280/441 |
| 6,813,914 | B2 * | 11/2004 | Chen | 70/50 |
| 2001/0023601 | A1 | 9/2001 | Gilbertson et al. | 70/258 |
| 2002/0095959 | A1 | 7/2002 | Meekma et al. | 70/209 |
| 2002/0108407 | A1 | 8/2002 | Zapushek | 70/34 |
| 2004/0031298 | A1 * | 2/2004 | Lai | 70/33 |

FOREIGN PATENT DOCUMENTS

| | | |
|---|---|---|
| TW | 195341 | 11/1992 |
| TW | 202704 | 3/1993 |
| WO | WO 00/63564 | 10/2000 |

* cited by examiner

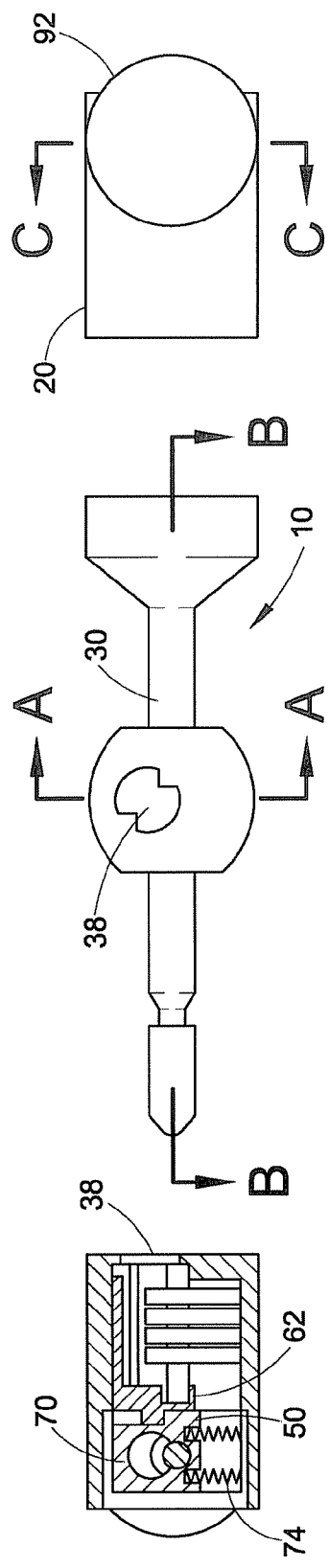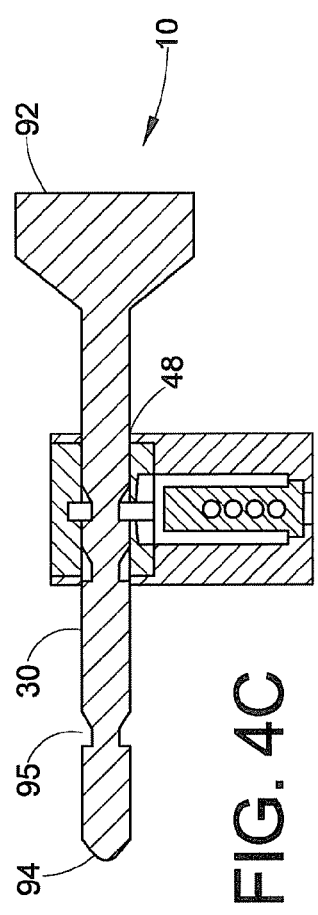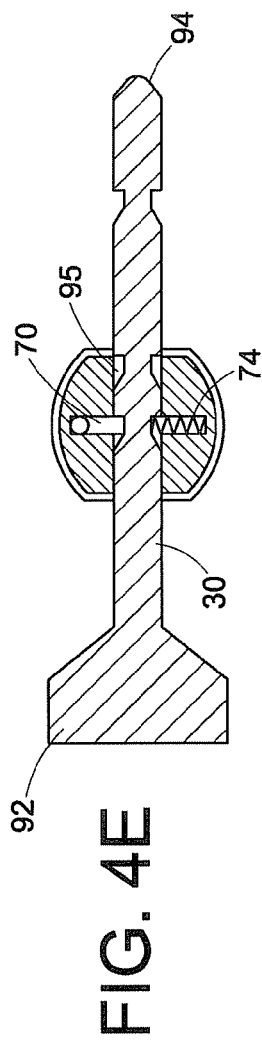

ADJUSTABLE WIDTH COUPLER LATCH LOCK

CROSS REFERENCE TO RELATED APPLICATIONS

This application claims the benefit of U.S. Patent Application Ser. No. 60/434,920, filed Dec. 19, 2003, and 60/481,330, filed Sep. 4, 2003, the entire disclosures of which are hereby incorporated by reference.

BACKGROUND OF INVENTION

The invention relates to a trailer hitch lock and, more specifically, to an adjustable stainless steel latch lock for securing a trailer hitch.

Coupler locks, trailer locks or hitch locks are known in the art. These locks are designed to prevent the uncoupling of a trailer that is attached to a vehicle. One method of coupling a trailer to a vehicle uses a ball connector-type trailer hitch. In such a hitch, a trailer has a receiver at the end of the trailer neck for a ball connector which is attached to the vehicle. The receiver of the trailer fits over the ball connector of the vehicle. A latch attached to the receiver is closed, securing the trailer to the vehicle so that it can be towed by the vehicle. In the absence of some type of coupler lock, the trailer receiver can often be easily and quickly unlatched and de-attached from the ball connector of the vehicle, by thieves for example, allowing for reattachment to another vehicle for the purpose of stealing the trailer and its contents. Coupler locks provide a way to secure the connection between trailer and vehicle such that it is not possible for the trailer to be removed from the vehicle without removing the lock.

A variety of types of coupler locks are available. However, such locks are not adjustable such that they can be used on latches of different widths. Furthermore, such locks are not always easy to install. Therefore, there is a need for new coupler locks that can be used on a variety of different sized latches and are easy to install.

SUMMARY OF INVENTION

The present invention provides an adjustable, stainless steel coupler lock that has a lock body and a shaft. The shaft is inserted into a closed latch of a trailer hitch and the lock body is slidably moved along the end of the shaft protruding from the latch. Positioned in this way, the latch of the trailer hitch cannot be opened. The lock body has a locking mechanism for locking and unlocking the device, and a locking plate that engages the shaft. The shaft has a narrow end and a flange end, and also has multiple recesses located along the length of the shaft. Each recess has a vertical edge, that engages the locking plate and prevents movement of the shaft out of the lock body without opening the locking mechanism. Each recess also has a tapered edge that allows movement of the shaft further into the lock body without opening of the locking mechanism. The multiple recesses on the shaft provide for the coupler lock to be used on latches of different widths.

BRIEF DESCRIPTION OF DRAWINGS

The present invention may be more readily understood by reference to the following drawings wherein:

FIG. 4A is a side view of the coupler lock of FIG. 1;

FIG. 4B is a cross-sectional view of the coupler lock of FIG. 1 as taken through A-A as shown in FIG. 4A;

FIG. 4C is a cross-sectional view of the coupler lock of FIG. 1 as taken through B-B as shown in FIG. 4A;

FIG. 4D is an end view of the coupler lock of FIG. 1;

FIG. 4E is a cross-sectional view of the coupler lock of FIG. 1 as taken through C-C as shown in FIG. 4D;

DETAILED DESCRIPTION

Figure 1:
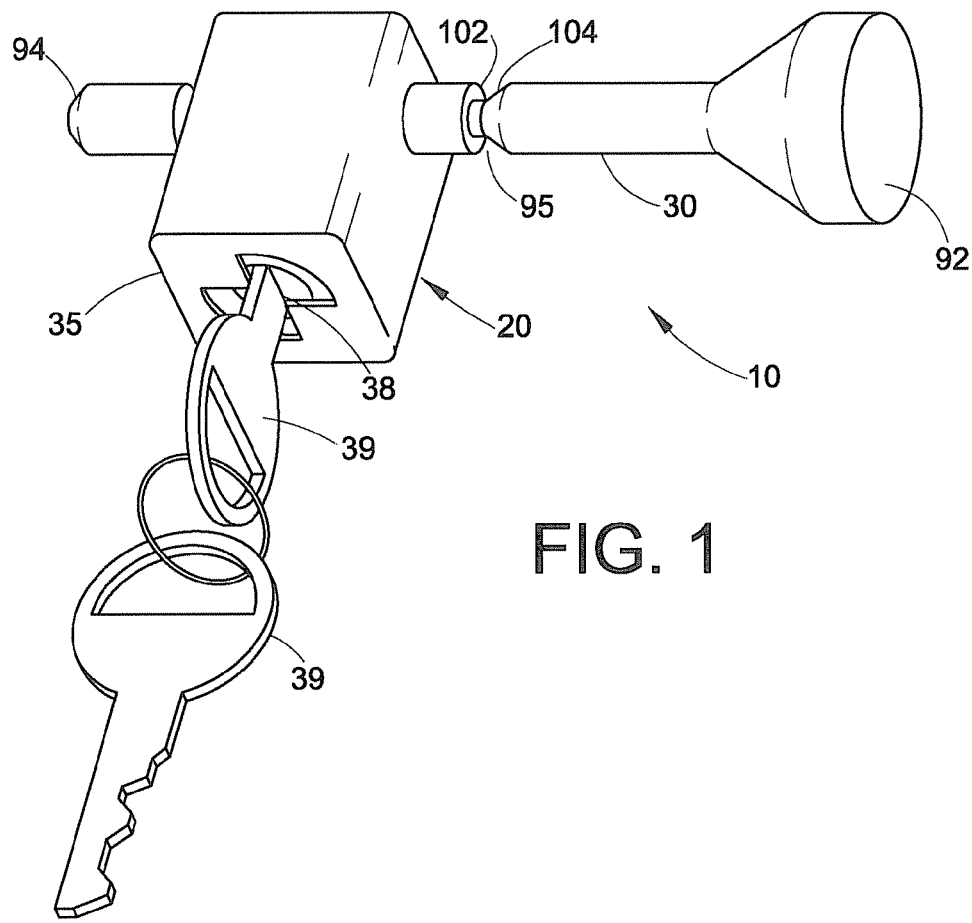
FIG. 1 is a perspective view of the assembled coupler lock of an embodiment of the present invention showing the shaft inserted into the lock body of the coupler lock and a key inserted into the keyway of the coupler lock.
Figure 2:
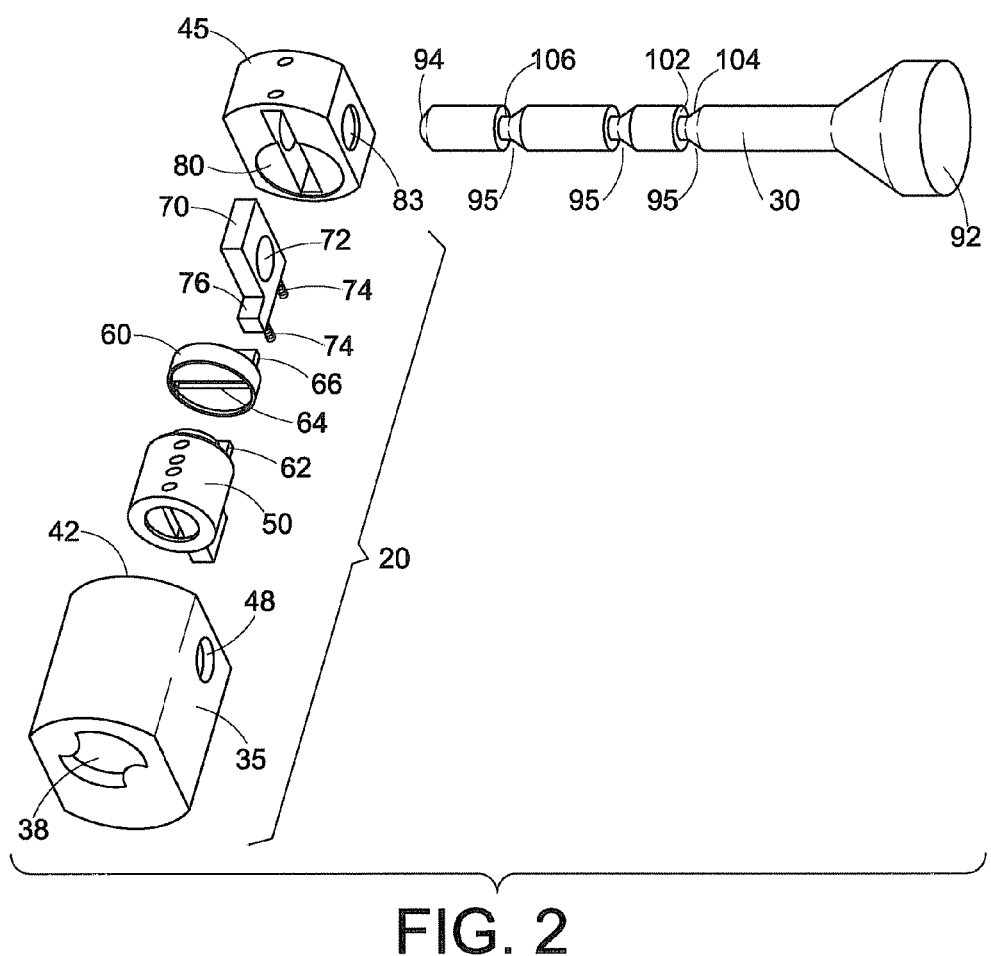
FIG. 2 is an exploded view of the coupler lock of FIG. 1.

FIG. 1 is a perspective view of the assembled coupler latch lock of the present invention, with a key inserted into the lock. FIG. 2 is an exploded view of the coupler lock of the present invention. Referring to these figures, it can be seen that the coupler lock 10 comprises a lock body 20 and a shaft 30. The lock body 20, components that comprise the lock body, and the shaft 30 are preferably made of stainless steel, making the coupler lock resistant to corrosion.

The lock body is comprised of an outer lock housing 35. The lock housing has a variety of openings. At one end of the lock housing 35, there is a keyway 38, into which a key 39 is inserted in order to open the lock. At the other end of the lock housing is an opening 42 for a housing cap 45. On either side of the lock housing 35 are housing shaft openings 48.

The lock housing 35 is the outer shell of the lock body 20. Various components fit into the interior of the lock housing 35, through the opening 42 for the housing cap 45, to yield the assembled lock body 20. One component that fits into the lock housing 35 is a locking mechanism 50. The locking mechanism 50 can be any of a number of types that are known in the art and can comprise a number of individual components that are not specifically indicated herein. For example, the locking mechanism 50 can be a pin-tumbler locking mechanism. In such case, the locking mechanism comprises components such as a cylinder plug, pin tumblers and optional sidebars, for example. The locking mechanism 50 may also be a wafer-tumbler lock, a push-button lock, or other types known in the art. The locking mechanism preferably is opened or unlocked through the use of a key 39 that is inserted through the keyway 38 of the lock housing 35. However, locking mechanisms 50 opened by other means, such as a numerical combination-type opening mechanisms, are possible. Whatever type of locking mechanism 50 is used, at one end of the mechanism is a means for engaging a cam 60. The means for engaging a cam is preferably a projection 62.

When fitted into the lock housing 35, one end of the locking mechanism 50 contacts, or is proximate to the keyway 38 of the lock housing 35. The other end of the locking mechanism 50 contacts the cam 60. The cam 60 is generally disc-shaped and has on one of its two faces a means for engaging the locking mechanism 64. The means for engaging the locking mechanism 64 is preferably a recess or groove in one face of the cam 60, although other means, such as, for example, an extension, notch, projection, gap opening, or arm can also be used. When the cam 60 is fitted into the lock housing 35, the cam groove 64 provides a space into which fits the projection 62 of the locking mechanism 50. On the other of its two faces, the cam 60 has a means 66 for engaging a locking plate 70. The cam means 66 for engaging the locking plate 70 is preferably a projection, although other means, such as, for example, an extension, notch, recess, gap, groove, opening or arm, can be used. A locking plate 70 also fits into the lock housing 35. One edge of the locking plate contacts the cam projection 66. As shown in FIG. 2, the locking plate is of a thin, rectangular shape, although other shapes and configurations may also be used. In the center of the locking plate 70 is a generally circular opening 72, through which an inserted shaft 30 fits through the lock body 20. Locking plate springs 74 engage an edge of the locking plate 70 and a housing cap 45. The springs 74 bias the locking plate 70 into a locking position, i.e. a position that prevents an inserted shaft 30 from being removed from the lock body 20. The edge of the locking plate 70 that contacts the cam projection 66 has a means 76 for engaging the cam. The means for engaging the cam is preferably a notch 76, although other means, such as, for example, an extension, projection, recess, gap, groove, opening or arm, can be used. The engagement of the locking plate 70 with the cam 60 allows for movement of the locking plate against the bias of the springs 74 when the correct key 39 is inserted into the lock and rotated. Such movement places the locking plate 70 in an unlocked position, i.e. a position that allows an inserted shaft 30 to be removed from the lock body 20.

A housing cap 45 is also fitted into the cap opening 42 of the lock housing 35. The housing cap 45 has a number of openings. One opening 80 is for fitting of the locking plate 70, springs 74 and cam 60. Another opening 83 is for insertion of the shaft 30 of the latch lock 10. The housing cap 45 holds in place the components of the lock body 20 which have already been described. The housing cap 45 is held in place within the lock housing by any of a variety of means known in the art. In one embodiment, the securing means is a set of screws or rivets inserted through the lock housing 35 into the housing cap 45.

Figure 3:
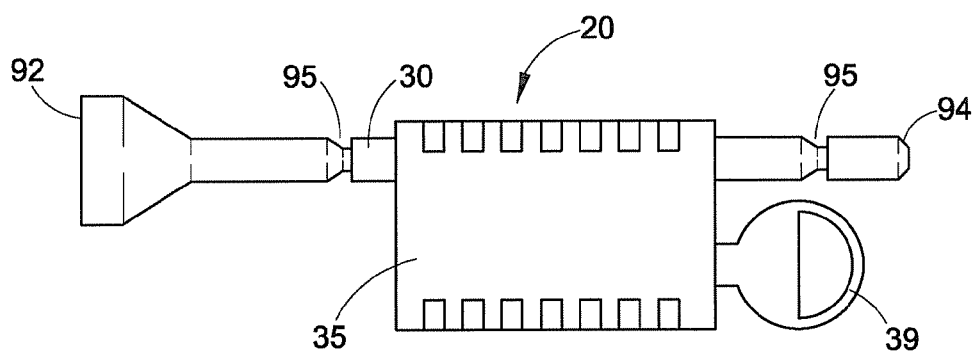
FIG. 3 is a side view of the coupler lock of FIG. 1 showing the shaft inserted into the lock body of the coupler lock.

The shaft 30 of the coupler latch lock 10 has a flange end 92 and a narrow end 94. Between the two ends of the shaft are numerous recesses 95. The number of recesses 95 is variable. The more recesses 95 there are on the shaft, the more adjustable the lock 10 is for latches 100 of different widths. Each recess on the shaft has two edges, a vertical edge 102 and a tapered edge 104. The vertical edge 102 of each recess 95 is nearer the narrow end 94 of the shaft 30 than is the tapered edge 104. The surface of the vertical edge 102 of the recess 95 is flat or substantially flat and perpendicular to the axis of the shaft 30. The tapered edge 104 of each recess 95 is nearer the flange end 92 of the shaft 30 than is the vertical edge 102. The surface of the tapered edge 104 of the recess 95 is preferably convex and is at an angle less than 90 degrees to the axis of the shaft 30. As discussed further herein, the angle of the tapered edge 104 provides for camming of the locking plate 70 when inserting the shaft 30 from the lock 10. FIGS. 3 and 4 show additional views of the inventive coupler lock.

Figure 5:
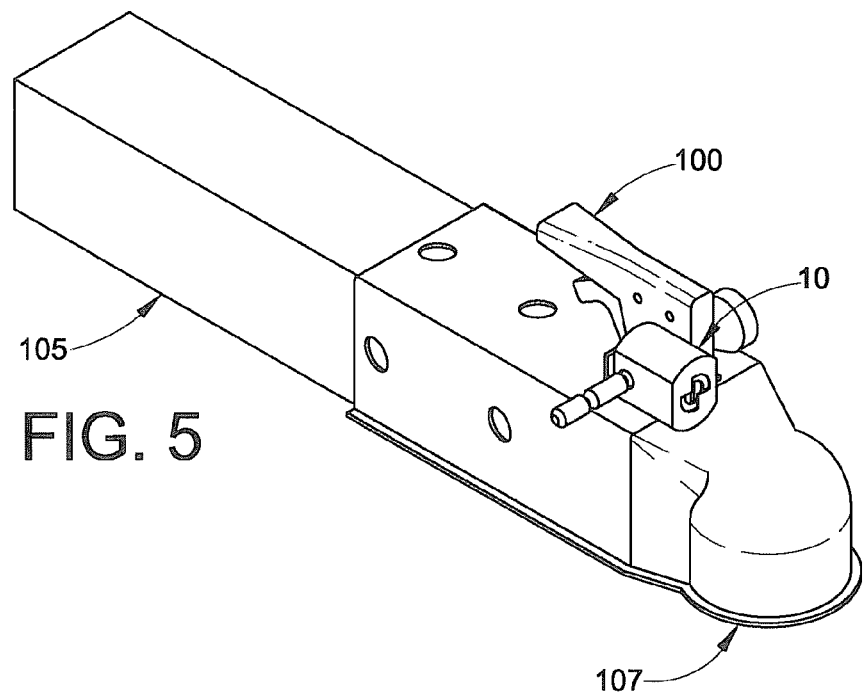
FIG. 5 is a perspective view of the neck of a trailer, showing a latch in a closed position and a coupler lock attached to the latch such that the latch cannot be placed in an open position without removal of the coupler lock.
Figure 6:
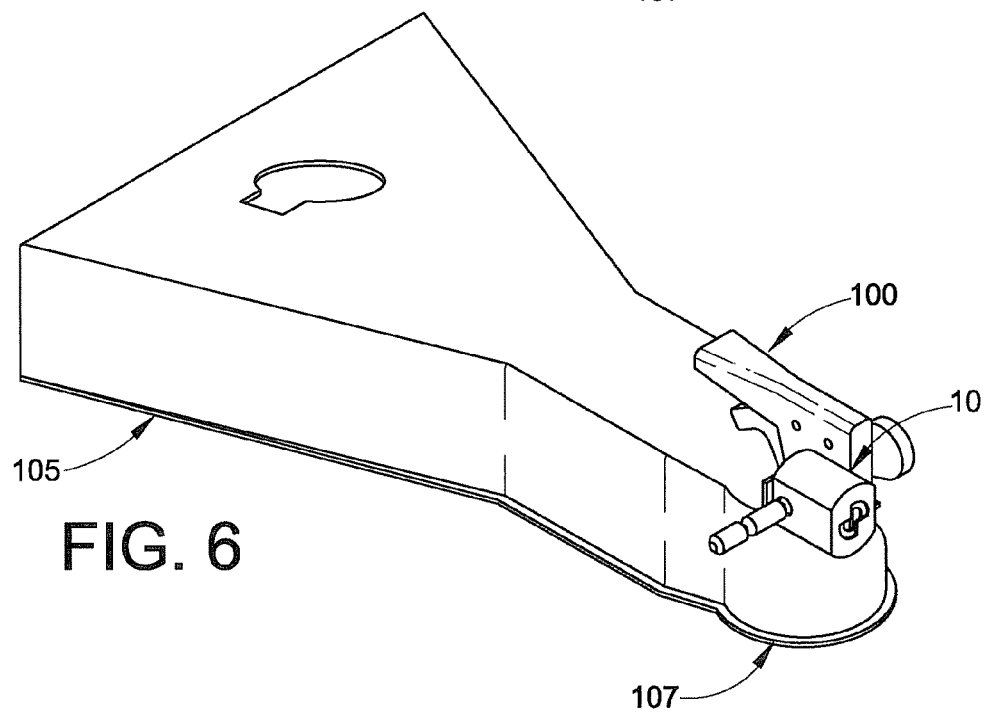
FIG. 6 is a perspective view of the neck of another trailer, showing a latch in a closed position and a coupler lock attached to the latch such that the latch cannot be placed in an open position without removal of the coupler lock.
Figure 5A:
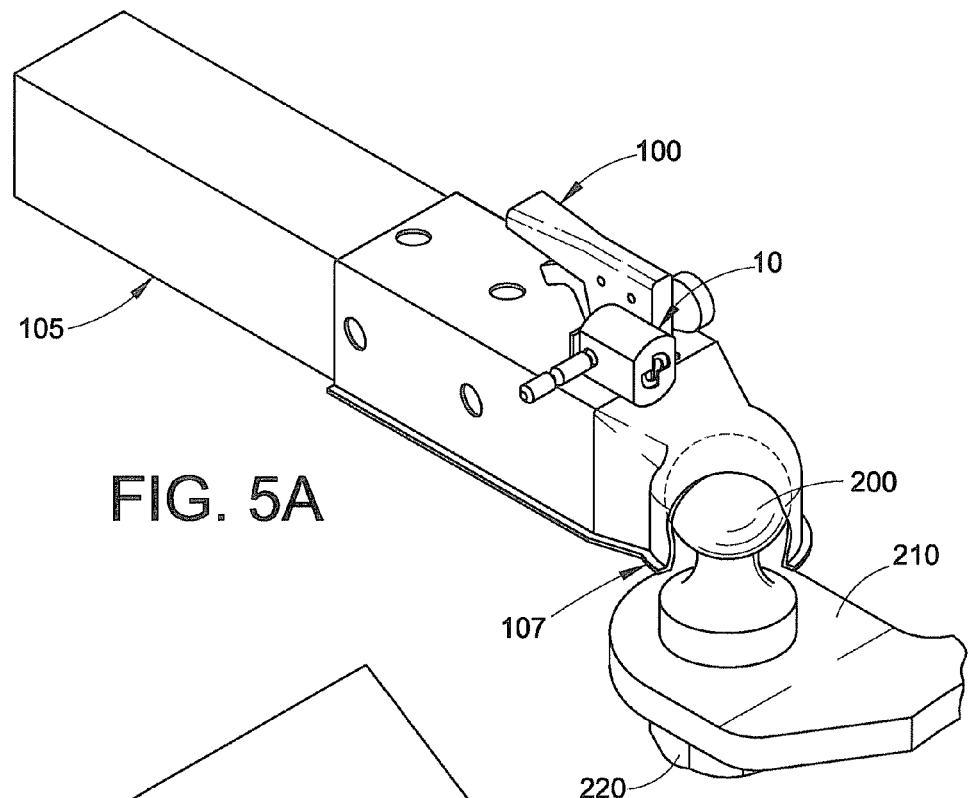
FIG. 5A is a perspective view of the lock assembly of FIG. 5, showing the latch in a closed position, the coupler lock attached to the latch, and the coupler, partially cutout, secured to a hitch ball.
Figure 6A:
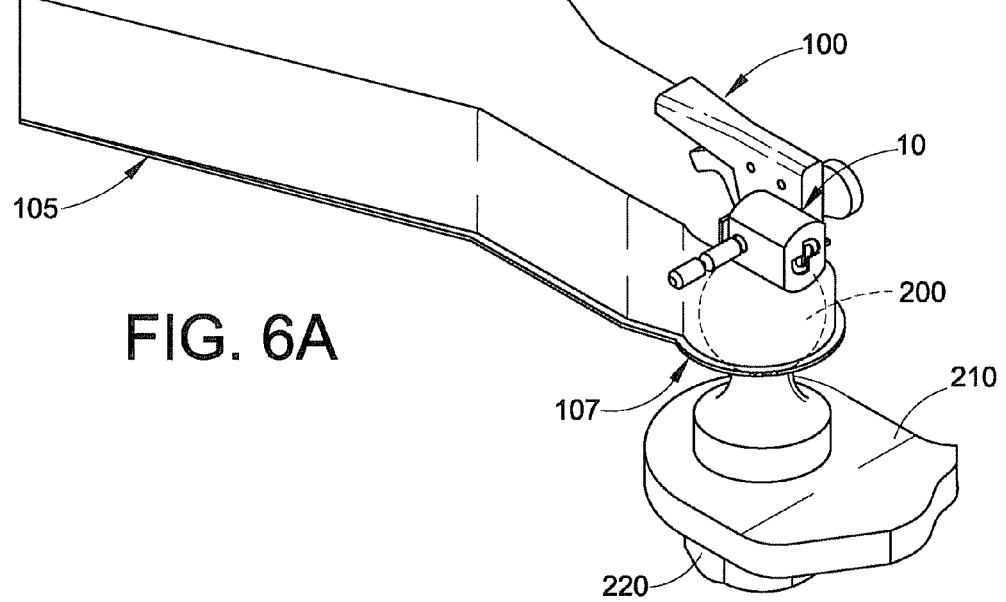
FIG. 6A is a perspective view of the lock assembly of FIG. 6, showing the latch in a closed position, the coupler lock attached to the latch, and the coupler secured to a hitch ball, which is shown partially in phantom.
Figure 7A:
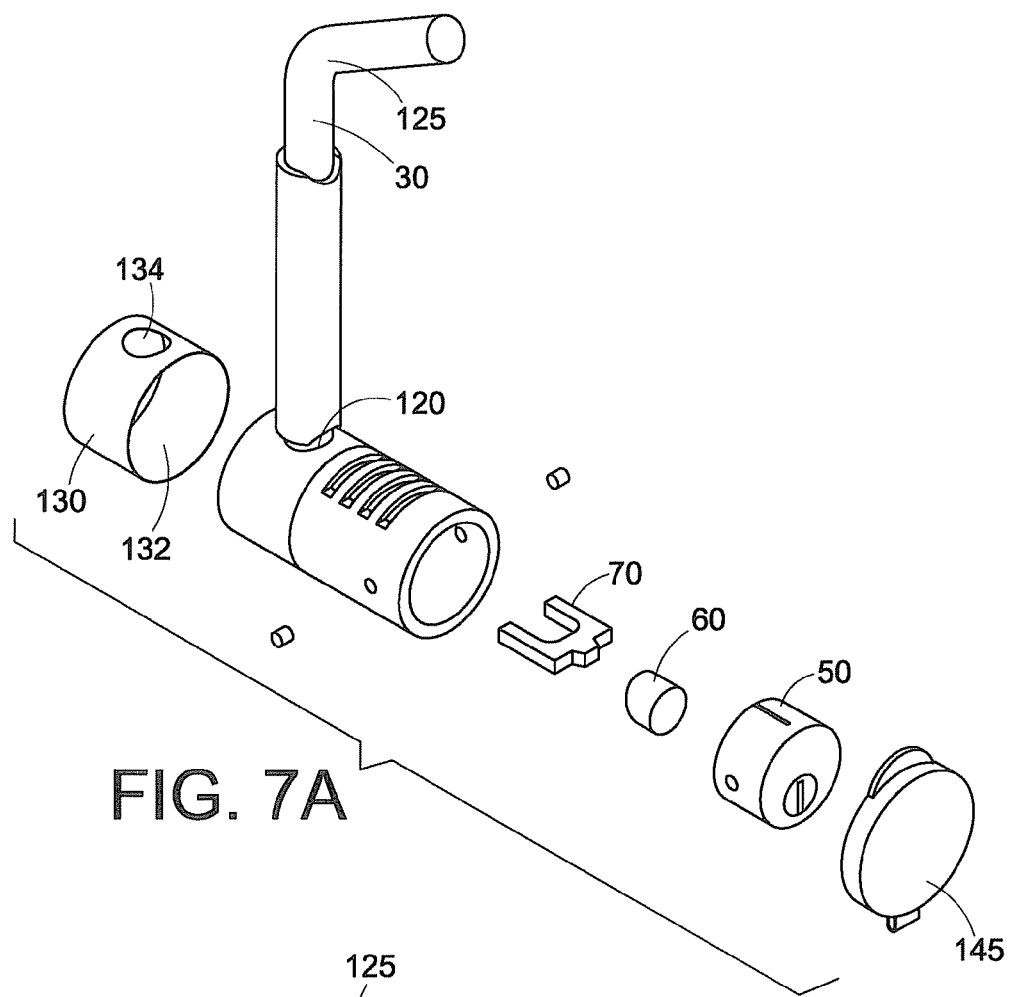
FIG. 7A is an exploded view of a second embodiment of the present invention.
Figure 7B:
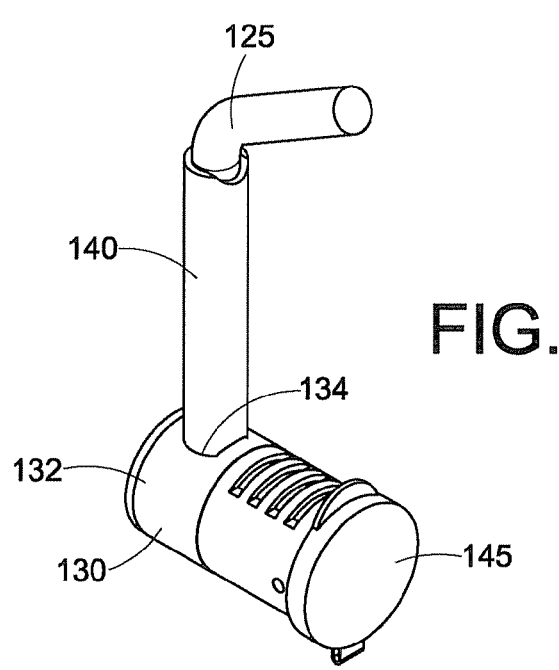
FIG. 7B is a perspective view of the embodiment shown in FIG. 7A.

The coupler lock 10 is operated as described below. The narrow end 94 of the shaft is inserted into an opening in the device 100 (e.g., the latch of a trailer hitch) that is desired to be locked or secured. The shaft 30 is pushed through the opening until it can be pushed any further, normally at the point where the flange 92 of the shaft contacts the device 100. The device is preferably a latch 100 of a trailer hitch 105, the latch securing the trailer to a vehicle. A ball receiver 107 is attached to the trailer neck 105 and the latch 100 provides a securing mechanism. The latch device 100 is preferably in the closed position, meaning, in the case of a trailer hitch, that the trailer cannot be disconnected from the vehicle without moving the latch to the open position. After insertion of the shaft 30 into and through the opening in the latch 100, the lock body 20 is attached to the shaft 30. This is done by moving the lock body 20 to a point where the narrow end 94 of the shaft enters and is inserted through the shaft opening 48 on one of the sides of the housing 35 of the lock body 20. The lock body 20 is designed such that the shaft 30 can be inserted into the lock body on either of the two sides of the lock body that has a shaft opening 48. When the shaft 30 is inserted into the lock body 20, the shaft extends through the shaft openings 83 in the housing cap 45 and through the opening 72 in the locking plate 70. The lock body 20 is slidably moved along the shaft 30 until the locking plate 70 within the lock housing 35 is aligned and engaged with one of the recesses 95 in the shaft 30. At such a point of engagement, the springs bias 74 the locking plate 70 into a position such that the edge of the locking plate opening contacts the bottom 106 and the vertical edge 102 of the recess 95. Preferably, the lock body 20 is slidably moved along the shaft 30 such that the locking plate 70 engages with a shaft recess 95 that is as close as possible to the flange end 92 of the shaft. The coupler lock is adjustable for latches 100 of different widths since the shaft of the lock has multiple recesses 95, each of which can engage the locking plate 70. However, it is preferable if the lock body 20 is positioned at a point along the shaft 30 such that the locking plate 70 engages the shaft recess 95 that is located closest to the latch 100. The tapered edge 104 of each shaft recess 95 provides a camming surface for the locking plate 70 such that the lock body 20 can be slidably moved along the shaft 30, in a direction toward the flange end 92, without the use of a key 39. The tapered edge 104 of the recesses allows biasing of the locking plate 70 against the force of the springs 74 as the shaft 30 is slidably moved the lock body 20. It is also possible to unlock the locking mechanism 50, using a key 39 for example, and then slidably move the lock body 20 along the shaft 30 toward the flange end 92. When the lock body 20 is engaged in a shaft recess 95, it is not possible to then slidably move the lock body 20 in the opposite direction along the shaft (i.e., in a direction toward the narrow end 94 of the shaft) in order to remove the lock body 20 from the shaft 30. When the coupler lock 10 is so positioned, the latch 100 of the hitch cannot be opened and the trailer cannot be removed from the vehicle. FIGS. 5 and 6 show the latch 100 of a trailer hitch in the closed position and the coupler lock 10 attached, as described above, locking the latch in the closed position. FIGS. 5A and 6A show the latch 100 of a trailer hitch in the closed position and the coupler lock 10 attached, as described above, locking the latch in the closed position. The ball receiver portion 107 of the coupler is shown in contact with a hitch ball 200. In the exemplary assembly shown, the hitch ball is mounted to a ball mount 210, 220.

In order to remove the coupler lock 10, attached as described above, from the latch 100, the correct key 39 is inserted into the keyway 38 of the lock body 20. Insertion of the correct key 39 allows the locking mechanism 50 to be rotated by rotating the key. Rotation results in unlocking of the locking mechanism 50. Because the projection 62 of the locking mechanism is engaged with the groove 64 of the cam 60, rotation of the locking mechanism 50 causes rotation of the cam 60 within the lock body 20. Rotation of the cam 60 in turn causes the cam projection 66, which is engaged by the notch 76 of the locking plate 70, to move the locking plate 70 in a direction opposite to the force of the springs 74. When the locking plate 70 moves, the edge of the locking plate opening 72 disengages the recess 95 on the shaft 30. When the locking plate 70 is positioned as such, the lock body 20 can be slidably moved along the shaft 30 in a direction opposite to that used to attach the lock 10 to the latch 100. Continued movement of the lock body 20 along the shaft 30 results in the shaft 30 being removed from the opening 48 in the lock body 20. Once the shaft 30 is no longer inserted into the lock body 20, the shaft can be removed from the opening in the latch 100. This allows the latch 100 to be moved from the closed position to an open position. In the open position, the trailer can be disconnected from the vehicle.

An advantage of the present invention is that the shaft 30 can be inserted from either direction, thereby allowing the user to insert the shaft through the housing cap shaft opening 83 from either side of the coupler. This is beneficial in that the shaft 30 can be inserted from different sides and using different hands, thereby allowing for easy application of the coupler lock 10. The figures illustrate the variable widths available and the ability to have the shaft inserted from either side.

In another embodiment, the mechanics of the lock mechanism remain the same, including a locking mechanism, cam 60 and locking plate 70 which is actuated by a portion of the cam. In this embodiment, a shaft 30 is inserted into a side opening 120 in the lock housing 35. The shaft has a bent section 125 opposite of the side that engages the locking mechanism 50, thereby prohibiting the movement of the shaft 30 from the lock 10 from removal once applied.

The receiver lock 10 can be made in a variety of sizes, such as, for example one half inch and ⅝ inch, and can be made with an adapter, such as, for example, a one half inch to ⅝ inch adapter.

The springs 74 in the coupler latch lock 10 are oriented perpendicular to the axis of the cylinder assembly 50 and cam protection 66. This allows the locking lever 70, or locking plate, to move up and down to achieve the various locking positions. The springs in the receiver lock are oriented inline with the axis. This along with the cam surface on the extension allows the locking lever 70, or locking plate, to be deadlocked in the locked position. The springs 74 keep the locking lever in contact with the extension so that when the cylinder assembly 50 is turned, the lever moves along the cam surface to the unlocked position and the hitch pin shaft can be removed.

Another aspect of the present invention is a seal 130 that is located on the exterior of the housing 35 of the receiver lock 10 around the shaft hole 120. This seal is secured to the housing by band 132 encircling the body. The seal is achieved by an opening 134 in the band with additional material extending into an opening in the housing that causes an interference fit between the seal 130 and the shaft 30. The seal 130 reduces the amount of water and debris that can enter into the lock mechanism 50. Water and debris in the lock mechanism can effect the performance of the lock.

In another embodiment, the shaft 30 of the receiver lock 10 can be covered in a protective material 140 that prevents scratching the surface of the lock or the object to which it is applied, such as a trailer coupler. As shown in the figures, this coating can either cover only a portion of the shaft 30, or cover the entire shaft (not shown). Optionally, a cap 145 can be used to provide protection to the lock cylinder from the surrounding elements.

The invention claimed is:

1. An adjustable coupler lock assembly for securing a coupler to a hitch ball, said lock assembly comprising:
   a coupler having a latch movable from an open position to a closed position;
   a hitch ball;
   a lock body having an opening therethrough;
   a locking mechanism disposed within said lock body; and
   a shaft for securing the lock body to said coupler;
   wherein said shaft is movable in either of two insertion directions relative to said lock body but not in an opposing withdrawal direction when the coupler locking mechanism is in a locked position, with said coupler latch in a closed position and said coupler in contact with said hitch ball.

2. The adjustable coupler lock assembly of claim 1, wherein said shaft comprises two or more recesses.

3. The adjustable coupler lock assembly of claim 2, wherein the shaft recesses have a vertical edge and a tapered edge.

4. The adjustable coupler lock assembly of claim 1, further comprising a cam engagable by said locking mechanism and engagable by a locking plate.

5. The adjustable coupler lock assembly of claim 4, wherein said cam includes a groove which engages said locking mechanism and a projection which engages said locking plate.

6. The adjustable coupler lock assembly of claim 5, wherein said locking plate includes a notch which is engaged by said projection on said cam.

7. The adjustable coupler lock assembly of claim 2, further comprising a locking plate, wherein said locking plate includes an opening through which said shaft is inserted.

8. The adjustable coupler lock assembly of claim 7, wherein said opening in said locking plate includes a peripheral edge which engages one of said two or more recesses when said coupler lock is in a locked position.

9. The adjustable coupler lock assembly of claim 2, further comprising a seal located around a portion of the lock body that seals against the shaft.

10. The adjustable coupler lock assembly of claim 2, further comprising a protective coating that is applied on a portion of said shaft.

11. A method of locking a coupler latch comprising the steps of:
   placing a coupler in contact with a hitch ball;
   closing a coupler latch into a locked position;
   inserting a shaft, which includes two or more recesses thereon, in one of two opposing insertion directions through an opening in said latch;

sliding a lock body over said shaft, wherein said lock body includes a locking mechanism and a locking plate; thereby inserting said shaft in either of two opposing insertion directions into said lock body;

spring biasing said locking plate in a direction such that the locking plate engages said shaft when said lock body is slid over said shaft; and sliding said lock body towards said latch;

wherein said locking plate engages said recesses in said shaft and allows continued advancement of said lock body toward said latch without unlocking said locking mechanism, but does not allow for the lock body to move in a direction opposite of the insertion direction.

12. The method of claim 11, wherein said shaft is inserted through an opening in said locking plate and said locking plate includes a peripheral edge that engages one of said two of more recesses.

13. An adjustable length lock assembly for securing a coupler to a hitch ball, said lock assembly comprising:
  a coupler having a coupler latch movable from an open position to a closed position;
  a hitch ball;
  a lock body defining an opening therethrough and comprising a locking mechanism and a locking plate; and
  a shaft having a narrow end, a flange end, and at least two recesses disposed between said narrow end and said flange end;
  wherein said shaft is insertable sequentially through said coupler latch and through said lock body opening from either of two opposing insertion directions with respect to said lock body, with said coupler latch in a closed position and said coupler in contact with said hitch ball,
  wherein engagement of the locking plate with one of the shaft recesses does not allow movement of the shaft through said lock body in an opposing withdrawal direction relative to the insertion direction unless the locking mechanism is unlocked.

14. The adjustable length lock assembly of claim 13, wherein said shaft and said lock body are made of stainless steel.

15. The adjustable length lock assembly of claim 13, wherein said at least two recesses have a vertical edge nearer the narrow end of the shaft and a tapered edge nearer the flange end of the shaft.

16. The adjustable length lock assembly of claim 13, wherein said shaft is movable through the lock body in the insertion direction without unlocking the locking mechanism.

* * * * *